United States Patent [19]

Neder et al.

[11] Patent Number: 4,572,678
[45] Date of Patent: Feb. 25, 1986

[54] CAGE FOR BALL BEARING, IN PARTICULAR A PLASTIC CAGE FOR A FOUR-POINT CONTACT BEARING

[75] Inventors: Günter Neder, Schweinfurt; Rainer Schürger, Schwanfeld, both of Fed. Rep. of Germany

[73] Assignee: SKF Kugellagerfabriken GmbH, Schweinfurt, Fed. Rep. of Germany

[21] Appl. No.: 657,234

[22] Filed: Oct. 3, 1984

[30] Foreign Application Priority Data

Oct. 8, 1983 [DE] Fed. Rep. of Germany ... 8329136[U]

[51] Int. Cl.[4] ............................................. F16C 33/38
[52] U.S. Cl. .................................. 384/533; 384/526; 384/534
[58] Field of Search ................ 384/523, 525–534; 308/201

[56] References Cited

U.S. PATENT DOCUMENTS

| 840,805 | 1/1907 | Riebe | 384/533 |
| 1,143,116 | 6/1915 | Hess | 384/533 |
| 1,665,448 | 4/1928 | Dake | 384/533 |
| 1,742,418 | 1/1930 | Schubert | 384/530 |
| 2,550,911 | 5/1951 | Cobb | 384/526 |
| 3,027,206 | 3/1962 | Potter | 384/534 |
| 3,502,376 | 3/1970 | Potter | 384/523 |
| 3,586,405 | 6/1971 | Claesson | 384/526 |

FOREIGN PATENT DOCUMENTS

| 273736 | 5/1914 | Fed. Rep. of Germany | 384/530 |
| 1903578 | 7/1970 | Fed. Rep. of Germany | 384/527 |
| 3641 | 1/1979 | Japan | 384/523 |
| 1348629 | 3/1974 | United Kingdom | 384/533 |
| 796509 | 1/1981 | U.S.S.R. | 384/530 |

*Primary Examiner*—Stuart S. Levy
*Assistant Examiner*—Thomas R. Hannon
*Attorney, Agent, or Firm*—Daniel M. Rosen

[57] ABSTRACT

A cage for a ball bearing is formed by a series of side rings connected in a circular arrangement by crosspieces. The crosspieces have surfaces formed thereon for defining cage pockets in which balls are inserted and held. Each side ring is thin-walled, whereas the crosspieces are relatively thick, so that the cage is elastic. The walls of each cage pocket comprise four circular cylindrical surfaces, an opposing pair of which are integrally connected to converging conical surfaces formed on the projections. The projections may extend either radially inwardly or radially outwardly from the crosspieces or both. The balls of the bearing are held in the pockets by the converging conical surfaces.

8 Claims, 4 Drawing Figures

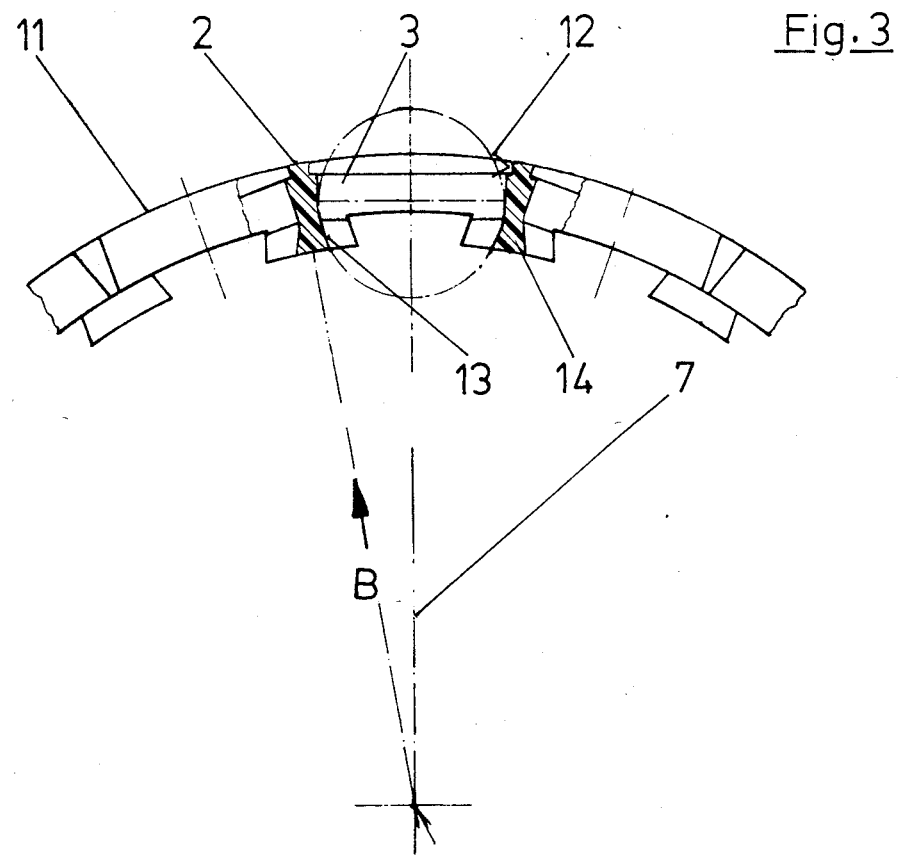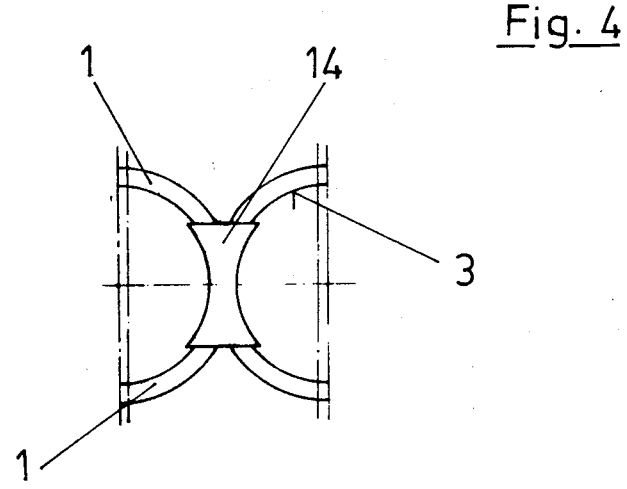

CAGE FOR BALL BEARING, IN PARTICULAR A PLASTIC CAGE FOR A FOUR-POINT CONTACT BEARING

TECHNICAL FIELD OF THE INVENTION

This invention relates to a cage for a ball bearing, in particular a plastic cage for a four-point contact bearing, comprised of a series of side rings joined by crosspieces and formed into a circular arrangement, the elements forming pockets for receiving balls, whereby the balls are held and guided by surfaces formed on crosspiece projections.

BACKGROUND OF THE INVENTION

A cage of the above-described type is disclosed in U.S. Pat. No. 3,027,206. In accordance with this known construction, the balls are inserted in the cage pockets and the projections are formed prior to assembly of the bearing. This cage has the disadvantage that its manufacture is very expensive.

Furthermore, four-point contact bearings are generally known in which the cage is inserted in the bore of an outer ring provided with a raceway and the balls are snapped into place radially from inside. These known cages have the disadvantage that if the space separating the holding projections is too small for the balls, very large forces are required in order to press the balls into place in the cage pockets and the projections can be easily broken. If the space separating the holding projections is too large, in which case easy snap-in of the rolling bodies is possible and a reduction in the number of balls can be achieved, the guidance of the balls by the cage is very inexact.

SUMMARY OF THE INVENTION

The object of the invention is to provide a cage which is sufficiently elastic that the force necessary to snap the balls into the cage pockets is negligible, without sacrificing precise guidance of the balls by the cage, and the large loads exerted in the circumferential direction can be withstood.

This object is realized by providing a cage in which the side rings are thin-walled and have a wavelike shape in the circumferential direction. Between the side rings in the circumferential direction, crosspieces are arranged. These crosspieces are thick relative to the wall thickness of the side rings and extend in the axial direction for a distance approximately equal to one-half of the cage width. By means of this refinement, an elastic cage is provided which is able to withstand large loads.

A further feature of the invention is that the walls of the cage pockets are formed in the area of the pitch circle by four circular cylindrical surfaces whose axes extend parallel to the center axis of the pocket and having center axes which are offset from the pocket center axis away from the surfaces, whereby the radius of the circular cylindrical surfaces is greater than the radius of the balls. As a result of this construction, the friction between the balls and the walls of the cage pockets is negligible. Furthermore, sufficient free space is provided between the balls and the cage to make possible the admission of lubricant.

In accordance with a further feature of the invention, the outer end of the cage pocket is provided with a cylindrical offset, whereby a good seal is provided in the tool.

The guidance function of the cage in the radial direction is realized by means of converging conical surfaces which are integrally connected to two opposing circular cylindrical surfaces of the cage pocket and arranged below and/or above the pitch circle. The conical surfaces are formed on crosspiece projections which extend radially from the cage body. In accordance with this arrangement, the surfaces increase the radial clearance between the balls and the cage so that the amount of friction is insignificant.

BRIEF DESCRIPTION OF THE DRAWINGS

The preferred embodiment of the invention is described in detail with reference to the following drawings:

FIG. 3 is a partial side view of the cage depicted in FIG. 1 with a cage pocket shown in section;

FIG. 4 is an enlarged view along direction B of FIG. 3 of a part of the cage according to the invention.

DETAILED DESCRIPTION OF THE PREFERRED EMBODIMENT

Figure 1:
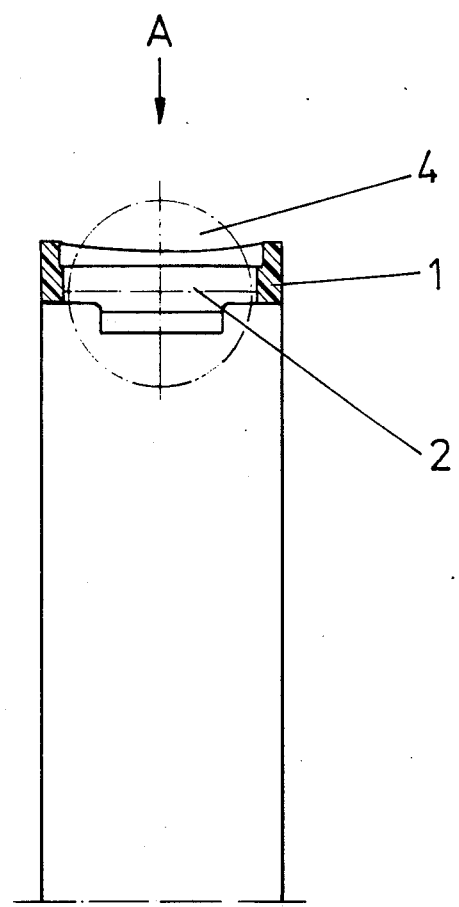
FIG. 1 is an axial section of a plastic cage for a four-point contact bearing made in accordance with the invention.
Figure 2:
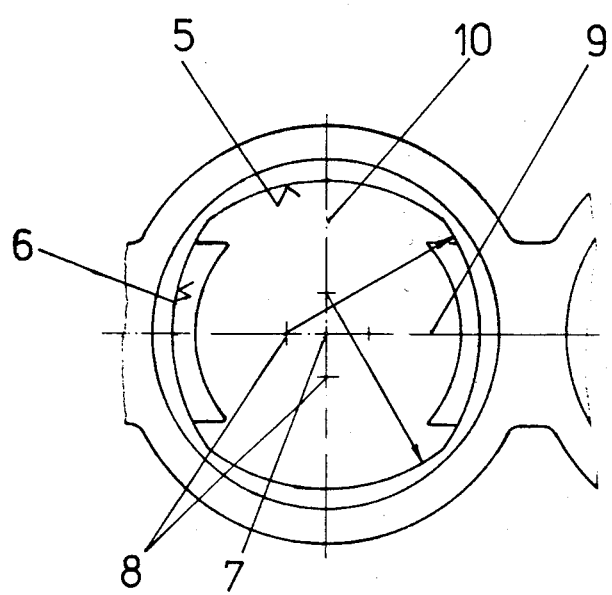
FIG. 2 is an enlarged view along direction A of FIG. 1 of a part of the cage according to the invention.

The plastic cage for a four-point contact bearing shown in FIGS. 1-4 comprises a circular arrangement of series-connected side rings 1 which are joined to each other by crosspieces 2. Each relatively thin-walled side ring 1 has a wavelike shape in the circumferential direction, the waves thereof extending axially as seen in FIG. 2. The side rings 1 and the crosspiece 2 form the cage pockets 3 for reception of balls 4 (only one of which is shown, denoted by the dash-dot circle in FIGS. 1 and 3). By means of this construction, the side rings 1 give the cage a high elasticity, so that the force required for pressing the balls into the cage pockets is negligible, yet the force exerted on the balls by the cage is sufficient to hold the balls in place. The walls of each cage pocket 3 are formed in the area of the pitch circle by four circular cylindrical surfaces 5, 6 extending parallel to the center axis 7 of the cage pocket 3 and opposite the offset center axes 8. Each of the four axes 8 intersect transverse axes 9 (extending tangentially of the cage) and 10 (extending axially of the ring), which in turn intersect at the center point (along center axis 7) of the cage pocket 3. The radius of the circular cylindrical surfaces 5, 6 is greater than the radius of the balls 4, thereby enabling the pocket walls to contact the ball at only four points. The cage pocket 3 has a cylindrical offset 12 extending radially outwardly from the cylindrical surfaces 5,6 to the outer radial surface 11 of the cage. Below the pitch circle, the circular cylindrical surfaces 6 arranged on the crosspieces 2 are respectively integrally connected to converging conical surfaces 13, which are formed on the crosspiece projections 14 to extend freely into the cage bore. These conical surfaces 13 serve to radially inwardly guide the balls 4. The crosspieces 2 extend in the axial direction for a distance approximately equal to one-half of the cage width. In the circumferential direction, the crosspieces 2 are relatively thick, providing a solid construction enabling the crosspieces to withstand the high loads generated as a result of the variable rolling conditions of the balls in the bearing.

The foregoing description of the preferred embodiment is presented for illustrative purposes only and is not intended to limit the scope of the invention as defined in the appended claims. Modifications may be readily effected by one having ordinary skill in the art without departing from the spirit and scope of the inventive concept herein disclosed. Thus, the cage according to the present invention is applicable not only to four-point contact bearings with divided inner rings, but, for example, also to radial contact ball bearings with divided inner rings as well as single-row angular contact ball bearings. In addition, the crosspiece projections 14, which extend into the cage bore and have the conical surfaces 13 formed thereon for enabling the cage to guide the balls, can also be arranged at the convex surface 11 of the cage, i.e. crosspiece projections 14 can be arranged both at the convex surface 11 and in the bore of the cage.

We claim:

1. In a one piece elastic plastic cage for a ball bearing comprising a pair of side rings interconnected by crosspieces forming pockets for receiving balls, said pockets having center axes, each of said crosspieces having projections formed thereon for guiding and holding a ball; the improvement wherein each of said side rings is formed of thin walls and has a wavelike shape in the circumferential direction, and said crosspiece arranged between each pair of adjacent pockets are thicker in the circumferential direction than the thickness of said thin walls of said side rings and extend in the axial direction for a distance approximately equal to one-half of the axial dimension of said cage, said cage pockets at the pitch circle of said bearing comprising four separate circular cylindrical surfaces with axes parallel to the center axis of the respective cage pocket.

2. A cage for a ball bearing as defined in claim 1, wherein the radii of said circular cylindrical surfaces are greater than the radius of said balls.

3. A cage for a ball bearing as defined in claim 1, wherein each of said cage pockets has a cylindrical offset between said cylindrical surfaces and the radially outer surface of said cage.

4. A cage for a ball bearing as defined in claim 3, wherein said outer surface of said cage is cylindrical.

5. A cage for a ball bearing as defined in claim 1, wherein an opposing pair of said circular cylindrical surfaces are integrally connected to respective converging conical surfaces.

6. A cage for a ball bearing as defined in claim 5, wherein a pair of said conical surfaces are formed on each of said projections, said projections extending radially inward below the pitch circle of said cage.

7. The cage of claim 1 wherein a first pair of said cylindrical surfaces are diametrically opposed with respect to the respective said center axis and the axes of said first pair of surfaces intersect the axis of said rings, and the second pair of said cylindrical surfaces are diametrically opposed with respect to the respective said center axis and the axes of said second pair of surfaces intersect the tangent of said cage at the respective said center axis, the axes of said first and second pairs of surfaces being displaced from the respective said center axis away from the respective cylindrical surface.

8. The cage of claim 1 wherein said projections comprise converging conical projections extending from said second pair of cylindrical surfaces.

* * * * *